(12) United States Patent
Wendt et al.

(10) Patent No.: US 12,286,919 B2
(45) Date of Patent: Apr. 29, 2025

(54) METHOD FOR CHECKING AN EXHAUST GAS SYSTEM IN A VEHICLE, AND CONTROL UNIT FOR PERFORMING THE METHOD

(71) Applicant: Robert Bosch GmbH, Stuttgart (DE)

(72) Inventors: Hauke Wendt, Ditzingen (DE); Tobias Pfister, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 183 days.

(21) Appl. No.: 18/059,187

(22) Filed: Nov. 28, 2022

(65) Prior Publication Data

US 2023/0175424 A1    Jun. 8, 2023

(30) Foreign Application Priority Data

Dec. 8, 2021 (DE) .................... 10 2021 214 004.1

(51) Int. Cl.
*F01N 3/20* (2006.01)
*F01N 3/08* (2006.01)
*F02D 41/28* (2006.01)

(52) U.S. Cl.
CPC ............ *F01N 3/208* (2013.01); *F01N 3/0885* (2013.01); *F01N 3/206* (2013.01); *F01N 2550/03* (2013.01); *F01N 2550/20* (2013.01); *F01N 2550/24* (2013.01); *F01N 2560/026* (2013.01); *F01N 2560/06* (2013.01); *F01N 2610/02* (2013.01); *F01N 2900/04* (2013.01); *F01N 2900/0406* (2013.01); *F01N 2900/12* (2013.01); *F01N 2900/1402* (2013.01); *F01N 2900/1602* (2013.01); *F01N 2900/1622* (2013.01); *F01N 2900/1806* (2013.01); *F01N 2900/1812* (2013.01); *F02D 2041/285* (2013.01); *F02D 2200/70* (2013.01); *F02D 2200/701* (2013.01)

(58) Field of Classification Search
CPC combination set(s) only.
See application file for complete search history.

(56) References Cited

U.S. PATENT DOCUMENTS

2009/0112334 A1* 4/2009 Grichnik ................. F02D 41/26
 700/48
2010/0101409 A1* 4/2010 Bromberg ............ B01D 46/444
 96/397

(Continued)

FOREIGN PATENT DOCUMENTS

DE     102021212868 A1    5/2023

*Primary Examiner* — Binh Q Tran
(74) *Attorney, Agent, or Firm* — NORTON ROSE FULBRIGHT US LLP; Gerard A. Messina

(57) ABSTRACT

A method and a control unit for checking an exhaust gas system in a vehicle. A control unit in the vehicle receives data from sensors of the vehicle and sends out control commands to final control elements of the vehicle. The control unit is in communication connection with an external computer located outside of the vehicle. The external computer causes the control unit to make an active intervention in the exhaust gas system by actuating final control elements of the vehicle. The control unit receives sensor data from the exhaust gas system, which it forwards to the external computer. Based on the sensor data from the sensors, the external computer rates the exhaust gas system as "OK" or "manipulated".

16 Claims, 2 Drawing Sheets

(56) References Cited

U.S. PATENT DOCUMENTS

| | | | |
|---|---|---|---|
| 2010/0258099 A1* | 10/2010 | Andersson | F02M 17/04 |
| | | | 261/62 |
| 2014/0338644 A1* | 11/2014 | MacNeille | F02M 26/46 |
| | | | 701/115 |
| 2015/0260074 A1* | 9/2015 | Argolini | F02D 41/027 |
| | | | 701/102 |
| 2020/0332736 A1* | 10/2020 | Gehrke | F01N 13/10 |
| 2021/0301700 A1* | 9/2021 | Brahma | F01N 3/105 |
| 2022/0371575 A1* | 11/2022 | Volmerding | F02D 41/024 |

* cited by examiner

METHOD FOR CHECKING AN EXHAUST GAS SYSTEM IN A VEHICLE, AND CONTROL UNIT FOR PERFORMING THE METHOD

CROSS REFERENCE

The present application claims the benefit under 35 U.S.C. § 119 of German Patent Application No. DE 10 2021 214 004.1 filed on Dec. 8, 2021, which is expressly incorporated herein by reference in its entirety.

FIELD

The present invention relates to a method and a control unit for checking an exhaust gas system in a vehicle.

BACKGROUND INFORMATION

Methods for checking an exhaust gas system in a vehicle, and corresponding control units, where the control units receive data from sensors of the vehicle and the control units send out control commands to final control elements of the vehicle, are described in the related art. Moreover, such control units may communicate with an external computer located outside of the vehicle, by way of a communications link. Functions of the vehicle or of the control unit may be monitored by the external computer in this way.

SUMMARY

A method according to the present invention for checking an exhaust gas system in a vehicle and the control unit according to the present invention may have the advantage that an external check of the proper functioning of the exhaust gas system is performed. This prevents the operation of the exhaust gas system from being compromised by manipulations of the control unit or vehicle or exhaust gas system. Specifically, it is possible to ensure in this way that systems that ensure a removal of NOx by injecting urea into an SCR catalyst are not manipulated in order to minimize the consumption of urea. Since it is not possible to predict when an external intervention will occur by influencing the vehicle or the control unit software of the exhaust gas system alone, it may be ensured in this way that the external computer provides a reliable categorization of the exhaust gas system as "OK" or "manipulated". The operational safety and reliability of the exhaust gas systems is thus increased.

Further advantages and improvements may be derived from the disclosure herein. According to an example embodiment of the present invention, by storing method steps for an active intervention, the amount of data that needs to be exchanged between the external computer and the control unit may be minimized. Alternatively, the corresponding method steps may be sent by the external computer, thereby further improving the security of the method against manipulation. In particular, the external computer may select various method steps for the active intervention. The active intervention may be made especially easily by changing the dosing quantity of a reducing agent for an SCR catalyst or by changing the fill level of a reducing agent in the SCR catalyst. Both an increase and a decrease in the reducing agent may be used in this case. Alternatively, the active intervention may be made by changing the operating temperature of the SCR catalyst or by intervening in the raw NOx emissions of the engine. The active intervention in the exhaust gas system by the external computer may be initiated on the basis of the vehicle operating period or other time constants. Alternatively, the external computer may initiate an active intervention only if previous operating data give rise to a suspicion that the exhaust gas system is being manipulated. The number of active interventions in the exhaust gas system may be minimized in this way. Furthermore, before an active intervention, it is possible to check whether the vehicle is in a suitable operating condition. Suitable operating conditions may also include a vehicle location that is determined by corresponding GPS data or navigation data from the vehicle. It is possible to ensure in this way that an active intervention is made only in operating conditions or in locations in which a possible deterioration in exhaust gas cleaning arising from the active intervention is relatively unproblematic.

BRIEF DESCRIPTION OF THE DRAWINGS

Exemplary embodiments of the present invention are shown in the figures and explained in more detail in the following description.

DETAILED DESCRIPTION OF EXAMPLE EMBODIMENTS

Figure 1:
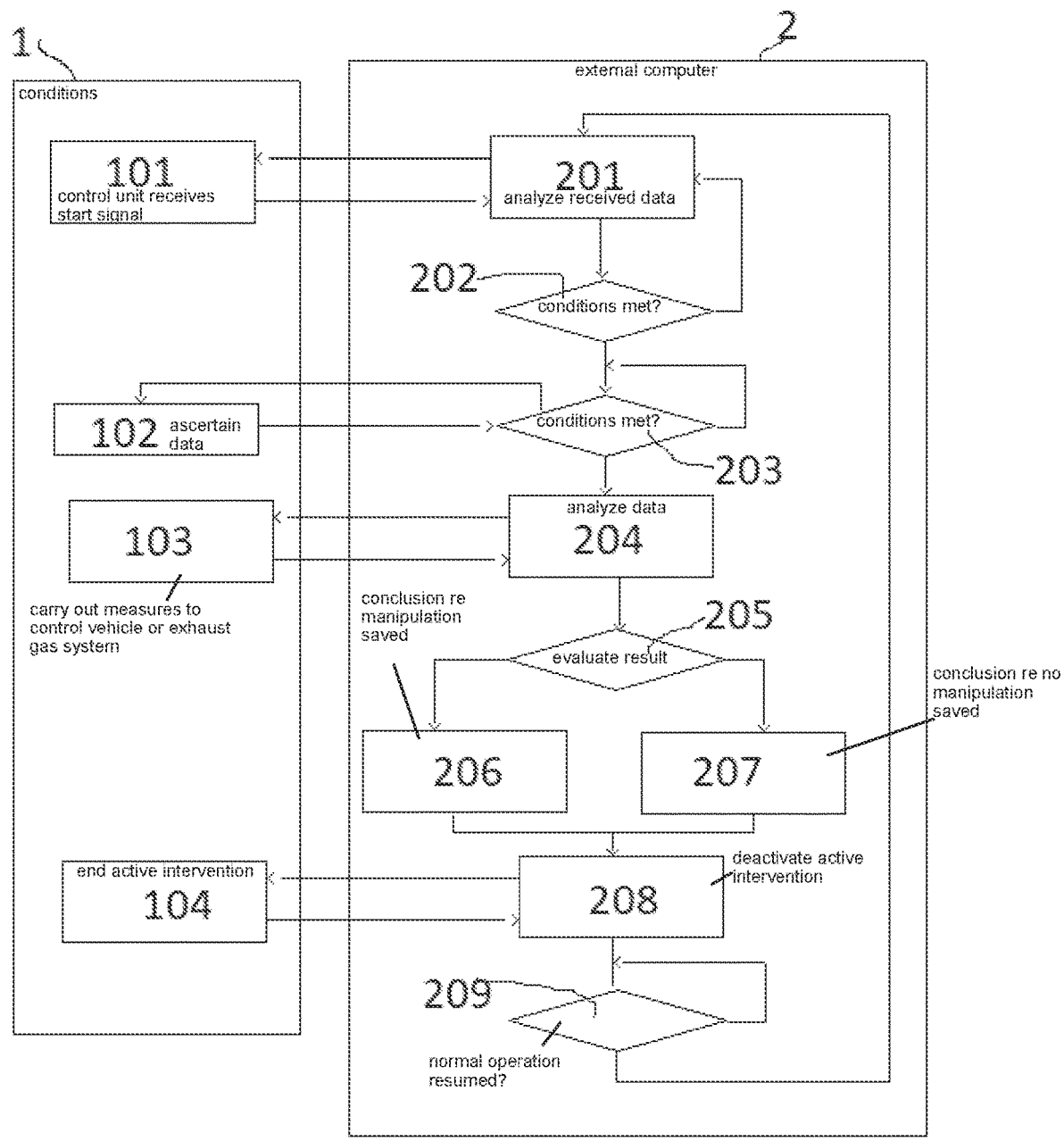
FIG. 1 shows a first exemplary embodiment of the present invention.

FIG. 1 shows a control unit 1 in a vehicle having an internal combustion engine, for controlling an exhaust gas system in said vehicle. To this end, control unit 1 receives signals from vehicle sensors regarding, for example, the load and speed of the internal combustion engine, measured values of the intake air flow, or an NOx content of the exhaust gas. Moreover, control unit 1 controls actuators or final control elements that influence, for example, the amount of air supplied, the amount of fuel injected, or the amount of reducing agent (NH3) injected into an SCR catalyst system to reduce NOX in the exhaust gas. The aim of such a controller 1 of an exhaust gas system in the vehicle is to minimize the amount of NOx that is released into the environment. To save on costs for the reducing agent, such control units 1 for controlling an SCR exhaust gas system are manipulated in such a way as to simulate a correct operation, despite suppressing an injection of reducing agent. As the amount of NOx emitted at the outlet of the exhaust gas system is usually close to zero, there are only a few possibilities for checking the plausibility of a reliable operation or a manipulation.

To this end, the present invention provides an interaction between control unit 1 in the vehicle and an external computer located outside of the vehicle, by way of which an improved check may be made as to whether or not a manipulation has occurred. To check for a possible manipulation, the external computer makes an active intervention in control unit 1 or the exhaust gas system. This intervention changes the operation of the exhaust gas system by control unit 1, and this operation may then be checked from signals sent back to the external computer by control unit 1. Such an approach is particularly easy to recognize, of course, if the active intervention brings about a change in the exhaust gases which appear at the catalyst outlet and which may be detected by measurement at a sensor (NOx sensor, for example) positioned downstream of the catalyst. Alternatively, an active influence may cause an adjustment of the control, which then gives rise to a corresponding readjustment by the control unit. In certain dynamic operating situations, this readjustment may then be identifiable from a temporary deterioration in the effectiveness of the exhaust gas system. This is the case if, for example, an SCR exhaust gas system is influenced with regard to an amount of reducing agent that is added or in the event of a change in the fill level of reducing agent in the SCR exhaust gas system.

In an active intervention, a slip of reducing agent (NH3) in the case of an overdosing of reducing agent or a temperature rise in the SCR catalyst system is identified by cross-sensitive NOx sensors over a given observation period (determined, for example, from the overdose quantity and/or from an NH3 slip model following the intervention). By way of example, it may be shown that the efficiency calculated with the NOx sensors must deteriorate over the observation period by a predefined value (see German Patent Application No. DE 10 2021 212 868). In this case, a certain NH3 concentration (absolute or integral) would be measured over the observation period. Alternatively, NOx slip may be identified in the case of underdosing or low temperatures in the SCR catalyst system. The observation period is determined as above from the underdosed amount of NH3 and/or the modeled NOx efficiency below a threshold. The evaluation is based on identified NOx peaks upstream of the SCR (identification from gradient) and evaluation of the associated signal downstream of the SCR (based on efficiency, for example). This process may usefully also be carried out over a number of peaks. In addition, the efficiency may be observed continuously over the observation period. In this case, the deterioration in the efficiency must correspond to the intervention.

Various active interventions in the exhaust gas system are particularly suitable for identifying a manipulation of the exhaust gas system.

a) Reducing the Dosing Quantity:

Reducing the dosing quantity leads to a reduced NOx conversion and hence to an NOx signal at the NOx sensor downstream of the SCR catalyst that is distinguishable from zero. Setting a so-called alpha α, which defines the ratio of NH3 supplied (calculated from the dosing quantity) to NOx emissions upstream of the SCR catalyst (or the NH3 needed to convert the NOx content in the exhaust gas), is particularly easy. If a constant alpha (e.g., α=0.8) is set, an efficiency of approximately 80% is achieved in a non-manipulated system, provided that certain conditions are met (catalyst temperature within a suitable range, exhaust gas mass flow rate not too high, etc.). As well as checking the end state (efficiency=80%), the transition from the "normal" dosage to the alpha-based dosage may also be observed in the NOx signal. In normal circumstances, the catalyst may continue to be operated for some time from its NH3 store and achieve conversions >80%. Checking this behavior ensures that it is particularly difficult to simulate the behavior, since the NH3 fill level is not directly visible, while a good operating strategy must explicitly consider and check the NH3 fill level. The plausibility of the transition back to the normal dosage may also be checked in this case.

b) Reducing the Target NH3 Fill Level:

Reducing the target fill level to a predefined value below the normal fill level has a similar effect to a). The efficiency arising from this reduced fill level is difficult to predict, resulting in additional security with respect to evasion. The corresponding NOx values expected for a system that has not been manipulated may be evaluated locally using a model value calculated in the control unit, or sent to the cloud for comparison there. Greater security is offered by transmitting the catalyst temperature, the NOx emissions upstream of the SCR and possibly other variables to the cloud, where a model for the specified fill level is stored. Checks are made in the cloud to determine whether the logged values for the three variables (NOx pre-SCR, NOx post-SCR, and catalyst temperature) are consistent with the specified catalyst operating point (target fill level at a given temperature). Although this type of combined evaluation, comprising active intervention and modeling in the external computer, is time-consuming, it is very secure.

c) Increasing the Dosage:

Increasing the dosing quantity leads to continuous filling of the SCR catalyst. After a certain overdosage (amount not needed for NOx conversion), depending on the catalyst temperature and the initial NH3 fill level, this leads to NH3 slip measured at the downstream NOx sensor. In this case too, the behavior is difficult to predict without taking the physical context into account and is thus difficult to simulate for the purposes of evasion. It is particularly easy (in terms of a low impact on emissions) to apply this approach if it is used on the first SCR catalyst of a catalyst system consisting of two catalysts. The NH3 slip generated for checking purposes is stored in the second SCR, where it may subsequently be used for NOx conversion.

d) Increasing the Target Fill Level:

Increasing the target fill level leads to overdosing and to a similar system response as in c).

e) Increasing the Exhaust Gas Temperature:

Increasing the exhaust gas temperature, by way of an electric heater or engine-based heating measures (e.g., throttling the air flow or other fuel injection pattern), for example, results in a higher catalyst temperature, which brings with it a lower NH3 storage capacity. This too leads to NH3 slip downstream of the SCR, which may be used to check the plausibility of the system behavior (see c).

f) Lowering the Exhaust Gas Temperature (e.g., by Dispensing with Heating):

If the exhaust gas temperature and hence the catalyst temperature is lowered, a short-term NOx spike is anticipated, just as when the fill level or dosage is reduced, and this may be used for a plausibility check. The exhaust gas temperature may be lowered in comparison to normal operation either by dispensing with a heating measure that would be necessary to maintain the temperature at a high level or by switching to a different engine operation that leads to a colder exhaust gas.

g) Changing the Raw NOx Emissions:

If it is possible to increase raw emissions for a short time by changing the engine operation (especially the exhaust gas recirculation rate), an NOx spike may be achieved in suitable circumstances downstream of the catalyst, and this may be used for plausibility checking.

The measures described may be used individually or in combination. In the latter case, they may be used simultaneously (e.g., increase in raw NOx emissions and reduction in dosing quantity) or successively (e.g., reduction in target fill level, followed by an increase). It is also possible to select the active measures according to the current operating conditions (primarily the SCR temperature). Thus, if temperatures are dropping, it is particularly quick and easy to hold the fill level at a low value relative to a fill level that is necessary for a good conversion, giving rise to NOx slip (the NH3 storage capacity of an SCR catalyst is greater at a lower temperature, and the same loading in absolute terms corresponds to a lower relative loading). If temperatures are rising, overdosing may be triggered, which by reason of the then higher temperatures leads particularly quickly to NH3 slip.

The active interventions may be carried out cyclically (e.g., every 2000 km or randomly between 500 and 2000 km). Alternatively, the active intervention is initiated on suspicion, in other words, data are analyzed passively and, on suspicion of a manipulation which cannot be confirmed with certainty or cannot be differentiated from a system error, the active intervention is triggered in order to confirm or refute the suspicion. In a further embodiment, the active interventions may be scaled, i.e., a small underdose may be activated, for example, and a larger underdose or another intervention is activated only if this does not produce a positive result (i.e., definitely not manipulated).

The logic for controlling the active intervention, i.e., the enabling and specification of the active intervention, may be stored in the control unit and activated by the external computer by way of a start signal or trigger signal, or may run in the external computer. In the latter case, the variable to be influenced in the control unit (e.g., target fill level) is specified directly by the external computer. In this case, the enable conditions ensure that the intervention is activated only if the conditions allow for a meaningful measurement and at the same time the likely impact on emissions is as low as possible.

In a further embodiment, the probable operating conditions are predicted on the basis of a GPS signal and are included in the enable logic. The accuracy of the prediction is increased if data from the navigation system are also taken into consideration or routes are learned, such that they may be predicted with greater success. A decisive factor for the activation of the active invention is the temperature of the SCR catalyst, as described above.

To this end, FIG. 1 shows, in addition to control unit 1, at least one external computer 2, with which a plausibility check or operational check of control unit 1 is carried out. Control unit 1 and external computer 2 are connected for this purpose by way of a communications link. The communications link is typically established by the exchange of radio signals, for example in accordance with a mobile communications standard such as LTE, for example. External computer 2 may also consist of a network of several computers, which together carry out the method steps described below.

In a step 101, control unit 1 receives from step 201 of external computer 2 a start signal from external computer 2, which starts a transmission of data from control unit 1 to external computer 2. In step 201, external computer 2 then analyzes the data thus received and in the subsequent step 202 decides whether or not an active diagnosis should take place. If in step 201 no suspicion of a manipulation is found on the basis of the data sent by control unit 1, then step 202 is followed by a repeat of step 201. If a possible manipulation of control unit 1 is found in step 202, then step 202 is followed by step 203. Also in step 202, the need for an active intervention may also be triggered simply by reason of a period of operation of control unit 1 or of the vehicle operated therewith (every 2000 km) or a simple time condition (once per month).

In step 203, a check is then made to determine whether the conditions for an active intervention are met. To this end, a start signal is sent to control unit 1, triggering step 102. Step 102 involves ascertaining data that are needed in order to determine an appropriate operating state for the active intervention. Such an appropriate operating state may consist in, for example, a particular load or speed of the internal combustion engine or a temperature reached by the SCR catalyst. Alternatively, the position of the vehicle may be taken into consideration by way of a navigation system or GPS data, to ensure that an active intervention, which may temporarily lead to a worsening of the exhaust gas emissions, is permitted only in certain geographical areas. If the conditions for the active intervention are not established in step 203, then step 203 is followed by a repeat of step 203. If the conditions for the active intervention are established in step 203, then step 203 is followed by step 204.

In step 204, the external computer controls an active intervention in control unit 1 by sending a corresponding control signal and start signal to control unit 1. In response to the sending of the control signal, in step 103 control unit 1 carries out measures a) through g) to control the vehicle or the exhaust gas system. Furthermore, the measured values for the vehicle or for the exhaust gas system resulting from the active intervention are measured in step 103 and transmitted to external computer 2. Also in step 204, the data are analyzed, and the result is evaluated in the subsequent step 205. If the vehicle is found to have been manipulated, a conclusion to that effect is saved in the subsequent step 206. If the vehicle is not found to have been manipulated, a conclusion to that effect is saved in the subsequent step 207. Step 226 [sic] or 207 is followed by step 208, in which the active intervention is deactivated. To this end, a corresponding signal is sent to control unit 1, in which the active intervention in the control of the vehicle is then ended in step 104. Also in this step, the result of the diagnosis as "manipulated" or "not manipulated" may also be stored in control unit 1. A corresponding acknowledgement of the success of step 104 may be sent if appropriate.

Step 208 is then followed by step 209, in which a check is made to determine whether normal operation, i.e., operation with no active intervention, has been resumed. This step is repeated until, on resumption of normal operation, the first step 201 is performed again.

Figure 2:
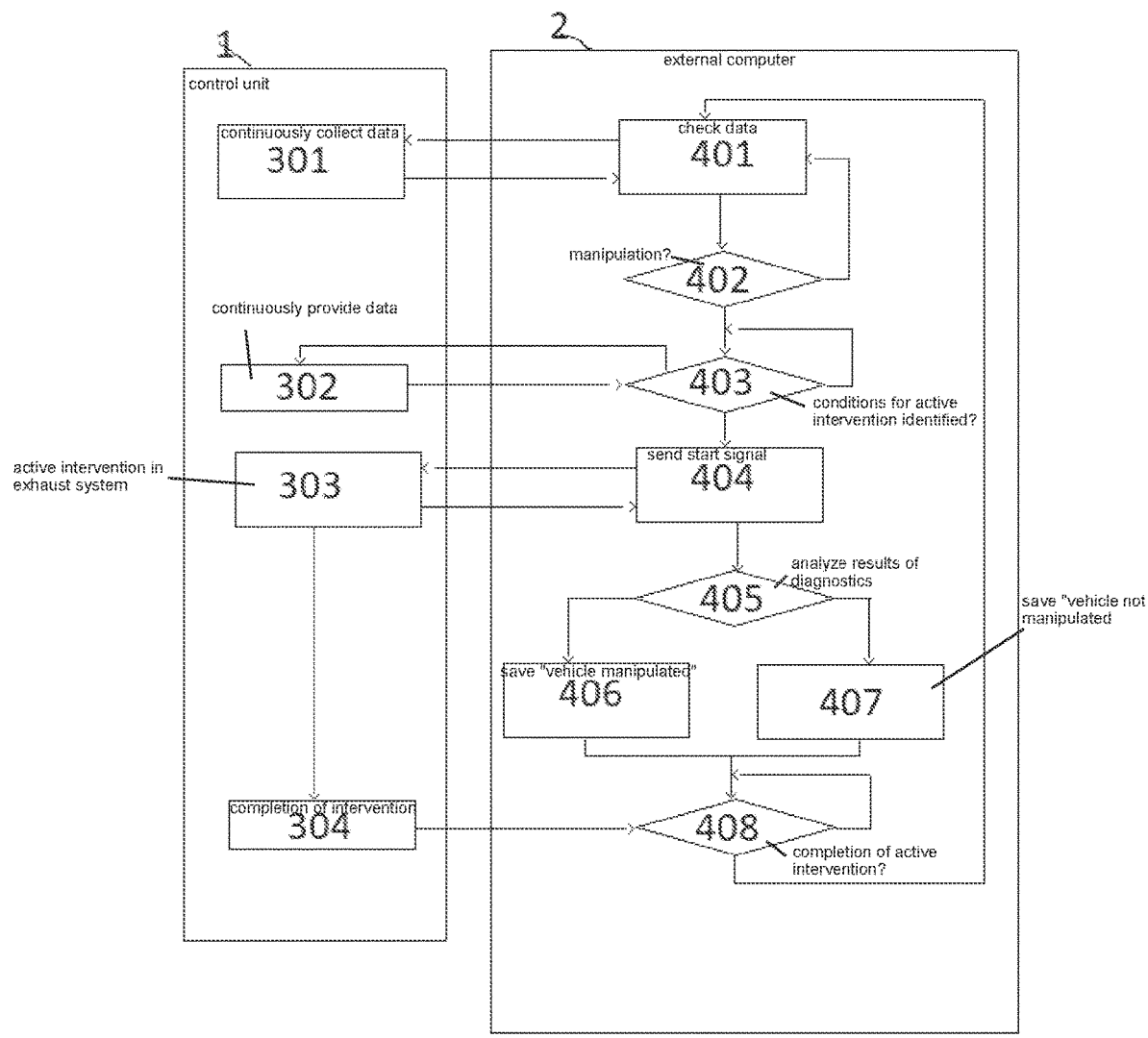
FIG. 2 shows a second exemplary embodiment of the present invention.

In the method illustrated in FIG. 1, control unit 1 is relative passive and the sequence of diagnostic method steps is controlled entirely by external computer 2. FIG. 2 shows an alternative method, in which control unit 1 plays a more active part in the vehicle diagnosis.

In the method illustrated in FIG. 2, in a method step 301, control unit 1 continuously collects data that are relevant to an assessment of the exhaust gas system and transmits these data to external computer 2. Method step 401, in which the data are checked for suspicion of manipulation of the exhaust gas system, is performed continuously in external computer 2. Step 401 is followed by step 402. If no manipulation is suspected, step 402 is followed by step 401 again (continuously). If a manipulation is suspected, step 402 is followed by step 403.

Step 403 checks data from control unit 1 that are continuously provided by step 302 in control unit 1. Step 403 is continued until appropriate operating conditions for an active intervention in the vehicle are identified. When appropriate operating conditions for an active intervention are identified, step 403 is followed by step 404.

In step 404, external computer 2 sends a start signal to step 303 in control unit 1. In step 303, an active intervention in the exhaust gas system is made in response to the start signal. This entire active intervention is already stored in control unit 1, however, so no control by external computer 2 is necessary. Different variants of the active intervention, a) through g), may also be selected in control unit 1 in this case, according to a specific algorithm. Alternatively, external computer 2 may also specifically initiate a particular variant of active intervention a) through g) in response to the start signal of step 404. However, the individual steps (such as adjusting the control value, reading the sensor data, and resetting the control value for the actuator, for example) of the different variants of the active intervention are stored in control unit 1. Furthermore, step 303 transmits the relevant measurement results to external computer 2 for evaluation in step 404, for example.

Step 404 in external computer 2 is followed by step 405, in which the results of the diagnosis arising from the active intervention are analyzed. If the suspected manipulation is confirmed, a corresponding "vehicle manipulated" entry is saved in step 406. If the suspected manipulation is not confirmed, a corresponding "vehicle not manipulated" entry is saved in step 407. Steps 406 and 407 are followed by step 408. In step 408, an appropriate status signal from control unit 1 is awaited. This status signal is generated by a step 304 in control unit 1, following on from step 303. Step 304 indicates the completion of the active intervention in the exhaust gas system. Step 408 is continued until it is ascertained that the active intervention has been completed. It is then followed by a repeat of step 401, in which the exhaust gas system is continuously monitored for suspicion of possible manipulation.

What is claimed is:

1. A method for checking an exhaust gas system in a vehicle, a control unit in the vehicle being configured to receive data from sensors of the vehicle and send out control commands to final control elements of the vehicle, the control unit being in communication connection with an external computer located outside of the vehicle, the method comprising the following steps:
   receiving, by the external computer, sensor data from the exhaust gas system;
   analyzing, by the external computer, the received sensor data;
   based on the analyzing by the external computer, determining by the external computer whether an active intervention in the exhaust system should take place;
   based on determining, by the external computer, that the active intervention in the exhaust system should take place, causing, by the external computer, the control unit to make an active intervention in the exhaust gas system by actuating the final control elements of the vehicle, the control unit receiving additional sensor data from the exhaust gas system after actively intervening, and forwarding the received additional sensor data to the external computer; and
   based on the additional sensor data from the sensors, the external computer rating the exhaust gas system as "OK" or "manipulated".

2. The method as recited in claim 1, wherein method steps for the active intervention are stored in the control unit and the method steps for the active intervention are initiated by the external computer.

3. The method as recited in claim 1, wherein method steps for the active intervention are sent by the external computer to the control unit and then carried out by the control unit in the vehicle.

4. The method as recited in claim 1, wherein the active intervention leads to a change in a dosing quantity of a reducing agent for an SCR catalyst or to a change in a fill level of a reducing agent in an SCR catalyst.

5. The method as recited in claim 1, wherein the active intervention leads to a change in an operating temperature of an SCR catalyst.

6. The method as recited in claim 1, wherein the active intervention leads to a change in raw NOx emissions from an internal combustion engine, the exhaust gases from which are supplied to the exhaust gas system.

7. The method as recited in claim 1, wherein the external computer suspects from the sensor data that the exhaust gas system is being manipulated and then initiates the active intervention to diagnose the exhaust gas system.

8. The method as recited in claim 1, wherein an active diagnosis is initiated only when the vehicle is in an appropriate operating condition.

9. The method as recited in claim 8, wherein GPS data or navigation data are used to determine appropriate operating conditions.

10. A control unit configured to check an exhaust gas system in a vehicle, the control unit configured to:
    receive data from sensors of the vehicle and send out control commands to final control elements of the vehicle, the control unit being in the vehicle and being in communication connection with an external computer located outside of the vehicle;
    send sensor data from the exhaust gas system to an external computer, the external computer analyzing the sent sensor data and, based on the analyzing, the external computer determining whether an active intervention in the exhaust system should take place;
    receiving signals from the external computer, the external computer sending the signals to the control unit based on the external computer determining the active intervention in the exhaust system should take place;
    actively intervene in the exhaust gas system, based on the signals from the external computer, by actuating the final control elements of the vehicle;
    receive, after actively intervening, additional sensor data from the exhaust gas system; and
    forward the received additional sensor data to the external computer.

11. The method as recited in claim 1, further comprising:
    based on the received sensor data, the external computer determining whether the vehicle is in an appropriate operating state for the active intervention in the exhaust gas system;
    wherein only when the external computer determines the vehicle is the appropriate operating state for the active intervention in the exhaust gas system does the external computer cause the control unit to make the active intervention in the exhaust gas system to diagnose the exhaust gas system.

12. The method as recited in claim 11, wherein, the control unit is in communication connection with an external computer by a radio link, and wherein to determine whether the vehicle is in the appropriate operating state of the active intervention in the exhaust gas system, the external computer uses GPS data of the vehicle or navigation data of the vehicle.

13. The method as recited in claim 11, wherein, to determine whether the vehicle is in an appropriate operating state for the active intervention in the exhaust gas system, the external computer uses: (i) a load or speed of an internal combustion engine of the vehicle, or (ii) temperature reached by an SCR catalyst of the vehicle.

14. The method as recited in claim 11, wherein the active intervention in the exhaust gas system the external computer causes the control unit to make temporarily leads to worsening exhaust gas admissions of the vehicle.

15. The method as recited in claim 1, further comprising:
based on the received sensor data, the external computer checking whether a suspicion is found that operation of the exhaust gas system has been compromised by manipulation of the control unit or the vehicle or the exhaust gas system;
wherein only when the external computer determines the suspicion is found does the external computer cause the control unit to make the active intervention in the exhaust gas system to diagnose the exhaust gas system.

16. The method as recited in claim 1, based on the received additional sensor, the external computer determining whether operation of the exhaust gas system has been compromised by manipulation of the control unit or the vehicle or the exhaust gas system, and the external computer rating the exhaust gas system as "manipulated" based on determining that the exhaust system has been compromised.

* * * * *